US009251629B2

(12) United States Patent
Kalinadhabhotla et al.

(10) Patent No.: US 9,251,629 B2
(45) Date of Patent: Feb. 2, 2016

(54) DETERMINING A TIME GAP VARIANCE FOR USE IN MONITORING FOR DISCONNECT OF A TELEMATICS DEVICE

(71) Applicant: HTI IP, LLC, Atlanta, GA (US)

(72) Inventors: Dedeepya Kalinadhabhotla, Atlanta, GA (US); Pankaj Sharma, Atlanta, GA (US)

(73) Assignee: HTI IP, LLC, Atlanta, GA (US)

( * ) Notice: Subject to any disclaimer, the term of this patent is extended or adjusted under 35 U.S.C. 154(b) by 253 days.

(21) Appl. No.: 14/095,561

(22) Filed: Dec. 3, 2013

(65) Prior Publication Data

US 2015/0154814 A1 Jun. 4, 2015

(51) Int. Cl.
*G01M 17/00* (2006.01)
*G07C 5/00* (2006.01)

(52) U.S. Cl.
CPC .................................... *G07C 5/008* (2013.01)

(58) Field of Classification Search
USPC ........................................................ 701/31.5
See application file for complete search history.

(56) References Cited

U.S. PATENT DOCUMENTS 5,189,619 A * 2/1993 Adachi .............. B60K 31/0008 180/170
5,229,941 A * 7/1993 Hattori ................. G05D 1/0217 180/167
5,428,544 A * 6/1995 Shyu .................. G01C 21/3492 340/902
5,928,294 A * 7/1999 Zelinkovsky ........ G05D 1/0265 180/168
6,032,097 A * 2/2000 Iihoshi ..................... G08G 1/22 180/168
6,249,232 B1 * 6/2001 Tamura .................. G08G 1/163 180/167
6,292,725 B1 * 9/2001 Kageyama ............. G05D 1/027 180/169
6,615,137 B2 * 9/2003 Lutter .................. G08G 1/0965 340/436
6,650,252 B2 * 11/2003 Miller, Jr. .............. G07C 5/008 340/988
6,681,157 B2 * 1/2004 Kageyama ............ B60W 40/04 701/1
7,382,274 B1 * 6/2008 Kermani ............ B60K 31/0058 340/435
7,383,121 B2 * 6/2008 Shinada ............... G08G 1/0965 340/905
7,617,041 B2 * 11/2009 Sera ......................... G08G 1/01 701/119
2005/0195383 A1 * 9/2005 Breed .................... B60N 2/002 356/4.01
2007/0135989 A1 * 6/2007 Hengst .................. B60W 40/04 701/117
2007/0159354 A1 * 7/2007 Rosenberg ........... G08G 1/0965 340/902
2007/0276600 A1 * 11/2007 King ...................... G08G 1/042 701/301

* cited by examiner

*Primary Examiner* — Hussein A. Elchanti

(57) ABSTRACT

Examples of a telematics device are configured to connect to an on-board diagnostics port of a vehicle and collect telematics data related to the vehicle. The telematics device examples perform processes to determine whether a time value received by an external source is accurate with respect to a variance value. Based on the determination, a clock time value may be either modified based the accurate time value received from the external source or left unmodified. In addition, an example provides a time gap determination that accounts for time between a reconnection of the telematics device to a vehicle diagnostics port and receipt of an external time value.

13 Claims, 5 Drawing Sheets

100

300

400

DETERMINING A TIME GAP VARIANCE FOR USE IN MONITORING FOR DISCONNECT OF A TELEMATICS DEVICE

BACKGROUND

In recent years, telematics devices have been provided to vehicle users by entities, such as insurance companies, trucking companies, and package delivery companies, to monitor vehicle operations by the respective vehicle users. When connected to a vehicle's on-board diagnostics port, the telematics device detects vehicle operating signals and collects and records operational data, such as vehicle speed, braking data, vehicle acceleration, maintenance and other operational data. The collected data may be sent to the entity, which can analyze the data e.g. to determine the driving habits of the vehicle users and an overall safety state of the particular vehicle. For example, an insurance company may use the collected data to determine the risk associated with a particular user and vehicle, and may adjust the user's insurance premium based on the collected data. The collected data may be retrieved, processed, and provided to the entity on a regular basis by a third party from the telematics device.

In order to avoid the collection of data, a user may disconnect the telematics device from the on-board diagnostics port. The telematics device receives power through a connection in the on-board diagnostics port. Disconnecting the telematics device from the on-board diagnostic port therefore not only disconnects the telematics device from the data source, but also disconnects the telematics device from its source of power. As a result, the disconnected telematics device does not collect any vehicle data and is unpowered. Afterwards, the user may reconnect the telematics device to the on-board diagnostics port. At least some telematics devices have the capability to detect such a disconnect period and provide indications to the entity that the telematics devices were disconnected for a period of time. Such a telematics device can also provide an indication of the duration of its disconnect time period, winch may be stored in memory. The indication of the duration of the disconnect time period may also be provided to the entity during an upload process.

For disconnect detection, the telematics device has an internal clock that starts when the telematics device is supplied with power (i.e. connected to the on-board diagnostics port). The telematics device synchronizes the internal clock to an external clock signal that may be received from different time sources, such as a global positioning system (GPS) satellite and a cellular network, such as a GSM/CDMA communication network. One or more of the external clock signals may be used to synchronize the internal clock. The telematics device receives clock signal updates from the different external time sources in order to prevent timing errors, for example, from time drift of the internal clock time value. The telematics device has an internal clock that updates a stored system time at a set interval. The external clock updates are received also received at a set interval that is greater than the internal clock update interval. The stored system time is replaced with the time provided by the external clock updates, and the internal clock synchronizes to the replaced system time. However, the accuracy of the updated clock signals from the different external time sources is unchecked, so an inaccurate external clock update signal, may have an adverse financial effect on the entity and/or the vehicle user.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level without detail, in order to avoid unnecessarily obscuring aspects of the present teachings.

The various systems and methods disclosed herein relate to insuring that a telematics device receives an accurate time signal from external time sources and handles an inaccurate time signal accordingly. The disclosed features are advantageous as they provide an added level of accuracy with respect to the timing data collected by the telematics device and reported to entities, such as insurance companies and the like.

Figure 1:
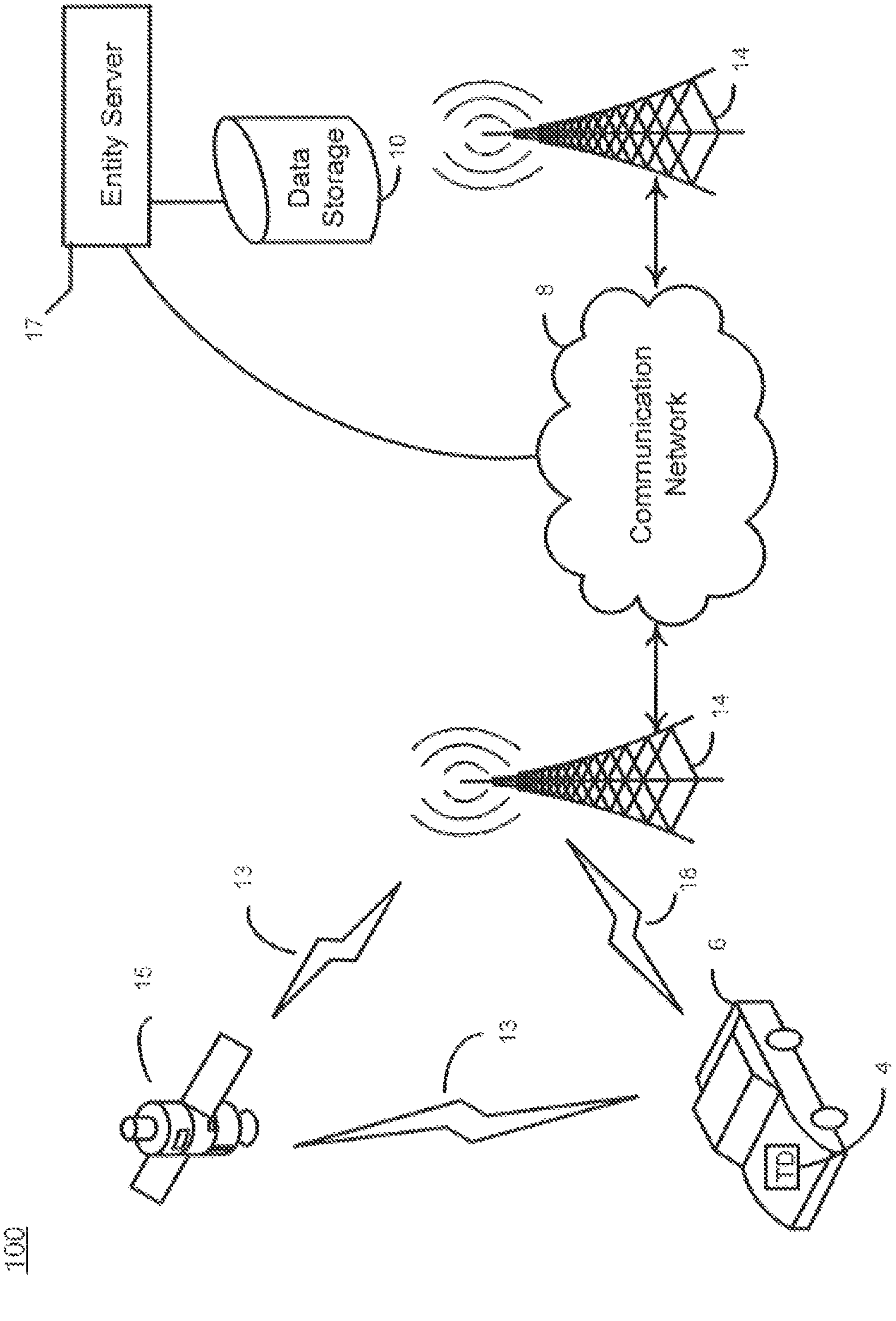
FIG. 1 illustrates an example of a system environment in which the disclosed examples may operate.

Reference now is made in detail to the examples illustrated in the accompanying drawings and discussed below. FIG. 1 illustrates an example of a system environment in which the disclosed examples may operate. The system 100 may include a telematics device (TD) 4 (e.g., in a vehicle 6), a communication network 8, communication network access points 14, a satellite 15, an entity server 17, and a data storage 10. The telematics device 4 is configured to receive and/or send communications via wireless communication channels 13 and 18 to/from the satellite 15 and the communication network 8, respectively.

The communication network 8 may be a cellular communication network configured to exchange data communications through the communication network access points 14 with the telematics device 4. The data communications may conform to known cellular communication protocols, such as, for example, code division multiple access (CDMA), global system for mobiles (GSM) and/or long term evolution (LTE). The data communications provided by the communication network 8 include a time signal value that indicates the current time value maintained by the communication network 8. In other words, the communication network 8 provides an external time signal to the telematics device 200. The communication network 8 is configured to communicate wirelessly with mobile devices, such as telematics device 4 in vehicle 6 or other user equipment (not shown), via communication network access points 14. The communication network access points 14 may be stationary or mobile cellular communication towers or the like.

The satellite 15 in the example is configured to provide location information as well as an external current time signal value. The data included in the time signal value provided by the satellite 15 may include the same or different data that the data provided in the time signal value provided by the communication network 8. The satellite 15 may provide the external current time signal value in addition to the communication network 8, or exclusively to the telematics device 200. The time signal value may be in the same or different format, and may include more or less data. For example, a telematics device 4 (discussed in more detail with reference to FIG. 2) is also configured to receive a satellite time signal value from the satellite 15. In an example, the satellite 15 is a global positioning system (GPS) satellite. In another example, the satellite 15 may be a proprietary satellite or satellite service implemented by an entity, such as a communications provider different from or the same as the provider of communication network 8, an automobile manufacturer, a satellite radio service, a roadside assistance service, or concierge-like service.

In some examples, the communication network 8 may receive time signals from the satellite 15 via the communication network access points 14. In which case, the communication network 8 bases its time signals on time signals received from the satellite 15, which are also sent to the telematics device 4.

The entity server 17 may exchange data via the communication network 8 and communication network access points 14 with the telematics device 4. The vehicle operating data collected by the telematics device 4 is provided to the entity server 17, and may be stored in the data storage 10. The data storage may be accessed by one or more entity servers 17. The entity server 17 may be controlled by or coupled to an entity, such as, for example, a data collection entity that provides the collected data to one or more other entities, an insurance company, a vehicle fleet management company, a rental car company, a taxi service, a trucking company, a parcel delivery company and the like. User equipment for accessing the collected or results from processing of such data are omitted for convenience.

In an example, the data storage 10 is configured to store data from the respective telematics devices 4. The collected data, for example, is arranged in a database containing a user profile associated with each monitored vehicle 6. An entity server 17, such as an insurance company server, is configured to access the user profile associated with the vehicle 6, and process the data provided by the telematics device 4 with respect to the data in the associated user profile. In this example, the accuracy of the timing data is important, for example, in order for the entity server 17 (e.g., insurance company server) to make accurate determinations regarding the upwards or downward adjustment of insurance premiums, or whether continued coverage is a cost benefit to the insurance company. In an insurance company context, an insured user may agree to use the telematics device to obtain a reduced premium or premium discounts. The usage-based premium discounts may vary significantly based on the insured's determined use of a telematics device 4. For example, the insured's premium discounts may be reduced by 20% if the insured uses the telematics device 90% of the time the insured is driving. However, if the insured uses the telematics device 80% of the tune the insured is driving, premium discounts decline to 5%. In other words, the premium is discounted more deeply when the device is plugged into the diagnostics interface for a longer period of time. Of course, other formulations or statistics related to use of the telematics device to determine user-based premiums and premium discounts may be used.

The telematics device 4 may include a number of features that allow the device to collect various forms of data from the vehicle on-board diagnostics port (i.e. diagnostics interface) and transmit the collected data to the entity server 17.

The telematics device (TD) 4 of FIG. 1 provides functions that validate the accuracy of the timing data received and generated by the telematics device 4. For example, in addition to an internal clock that provide timing signals to a telematics processor, the telematics device 4 receives external timing signals from the satellite 15 and the communication network 8. The telematics device 4 also has a non-volatile memory device that occasionally records time data as system time data. The occasions for storing the time data may be at a regular time interval, an irregular time interval, in response to an event, such as the vehicle crossing from one time zone to another, or the like. In the event that the telematics device is disconnected from power (i.e. disconnected from the vehicle 6 on-board diagnostics port (not shown)), and is not operating for a period of time, the non-volatile memory retains the stored time data. Once power is restored, for example, by reconnecting the telematics device 4 to the on-board diagnostics port, the external timing signals provided by the satellite 15 and the communication network 8 as the telematics device 4 reboots allow the internal clock to synchronize to a current time. The telematics device 4 uses the current time obtained from the external timing signals to determine how long of a time the telematics device 4 was disconnected from the vehicle 6 on-board diagnostics port. The time duration is stored in the memory of the telematics device 4 and provided to the entity server 17. The telematics device 4 also validates the external timing signals by comparing the received timing signals to the currently recorded system time data. These telematics device components and functions will be described in more detail with respect to FIGS. 2-4.

Figure 2:
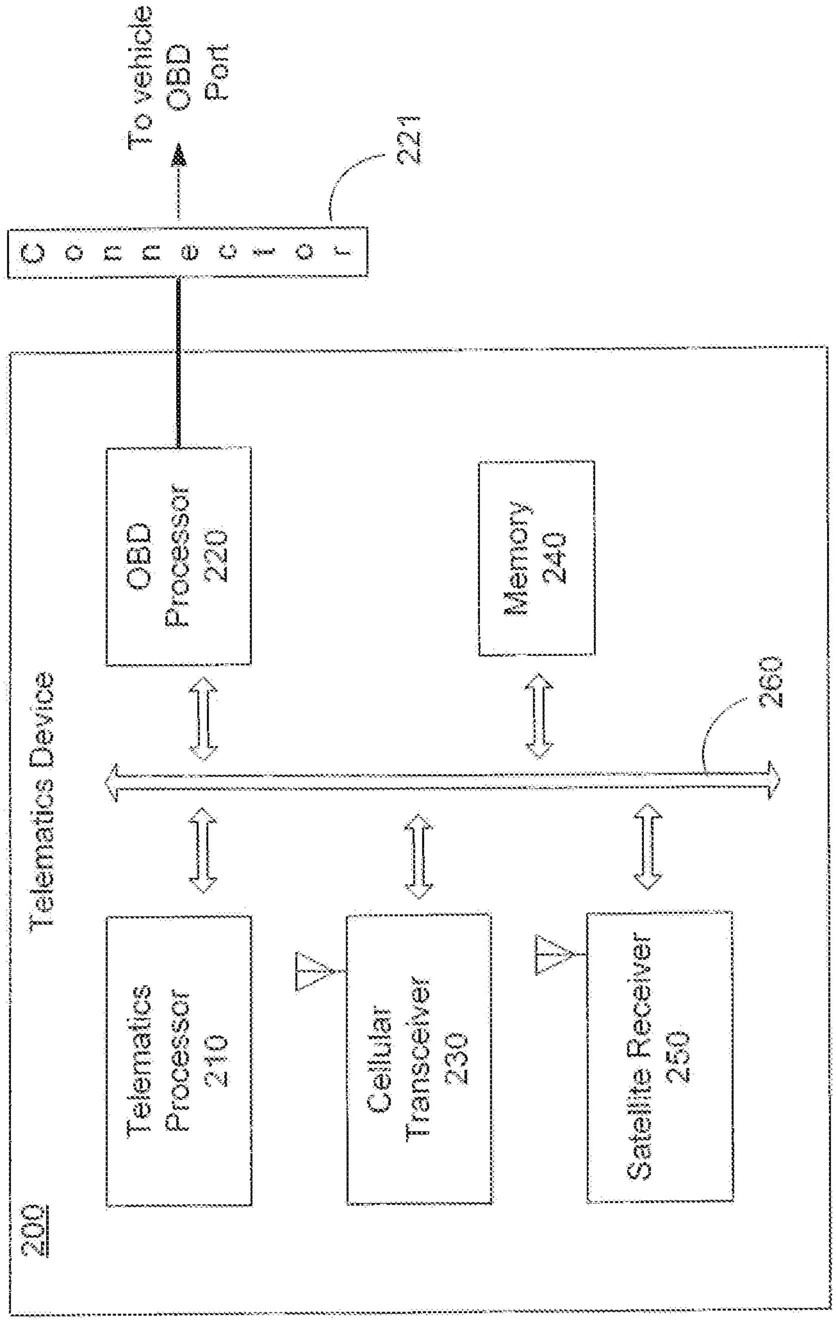
FIG. 2 illustrates an example of a telematics device that implements the features of the disclosed examples.

FIG. 2 illustrates an example of a telematics device that implements the features of the disclosed examples. In the example of FIG. 2, the telematics device 200 includes a telematics processor (i.e. central processing unit) 210, an on-board diagnostics processor 220, an on-board diagnostics (OBD) connector 221, a cellular transceiver 230, a memory 240, a satellite receiver 250, a telematics device clock 270, a communication bus 260 and antennas for receiving and transmitting signals via the transceiver 230 or the receiver 250 signals. The communication bus 260 is communicatively coupled to each of components 210-250 of the telematics device 200.

The telematics device 200 receives power from the vehicle 6 on-board diagnostics port (not shown) when the OBD connector 221 is connected to the vehicle 6 on-board diagnostics port. The OBD connector 221 includes, for example, a pin or pins that provide electrical power to the telematics device 200 and associated components 210-250 via a power supply bus (not shown). When the OBD connector 221 is not connected to the vehicle on-board diagnostics port, the telematics device 200 is unpowered and does not operate. In other words, when disconnected from the on-board diagnostics port, the telematics device 200 is unable to collect data related to the operation of the vehicle from the vehicle on-board diagnostics port, unable to receive time signals from external time sources, such as the satellite 15 or communication network 8, and unable to transmit data to the communication network 8.

In yet another example, the telematics device 200 includes an internal power source, such as a battery or solar cell (not shown), that allows the telematics device 200 to communicate data, such as an indication that the OBD connector 221 is disconnected from the vehicle ODP.

The OBD processor 220 is communicatively coupled to the communication, bus 260, and is configured to control and manage the collection of data from the vehicle on-board diagnostics port. The connector 221 and the OBD processor 220 provide a telematics communication interlace to the components (e.g. brakes, speedometer, airflow sensors, and the like) and systems (e.g., airbag deployment, engine, all-wheel drive, and the like) of the vehicle 6 that allows data to be communicated to the telematics device 200 from the vehicle 6. In general, the data collected by the OBD processor 220 may be processed (e.g. reformatted, parsed and/or compressed) and transmitted over bus 260 for storage in memory 240. The memory 240 may be a non-volatile memory, such as a Flash memory or other solid-state memory, or a hard-disk drive. The OBD processor 220, in certain examples, processes the collected data prior to transmitting the data over the bus 260 for storage in memory 240. For example, prior to storing the collected data, the OBD processor 220 may reformat the collected data into a format more conducive for processing by the telematics processor 210 and/or transmission to the entity server 17. Alternatively, or in addition, the telematics processor 210 from time to time, such as periodically or when the memory is filled near to its capacity, causes the telematics device 200 to send the collected vehicle operational data and timing data from memory 240 to the server 17, for example, using the cellular transceiver 230. Alternatively, the server 17 may poll telematics devices 200 via cellular transceiver 230 to collect vehicle operational data.

The telematics processor 210 is configured to control and manage data received from the cellular transceiver 230 and the satellite receiver 250. Data received by the cellular transceiver 230 and the satellite receiver 250 is communicated over the communication bus 260 to the telematics processor 210. The 210 processor includes an internal clock that from time to time provides a time value that is used to update the system time, and stored in memory 240 to provide a time stamp relative to the collected vehicle operational data. For example, every X minutes, where X is an integer, the internal clock provides a time value that the processor 210 records as the system time value in memory 240. The internal clock time values on occasion is synchronized to external time values received from the cellular transceiver 230, die satellite receiver 250, or both.

The cellular transceiver 230, for example, is configured to communicate via the communication network 8 of FIG. 1. In certain examples, the cellular transceiver 230 is configured to communicate using one or more cellular communication channel protocols, such as, for example, code division multiple access (CDMA), global system for mobiles (GSM) or long term evolution (LTE). The cellular transceiver 230 is further configured to receive time signal values from the network 8, and provide the time signal values to the telematics processor 210 for analysis and processing. In addition, the cellular transceiver 230 may transmit or receive additional data, such as status information related to the telematics device 200, data or status requests from the entity server 17, vehicle operating data retrieved from memory 240 and the like, to/from the entity server 17.

The satellite receiver 250 is configured to receive location data and time signal values, and provide the received data and time signal values to the telematics processor 210. The satellite receiver 250, in an example, is configured to receive global positioning system (GPS) signals that include a time signal value. In other examples, the satellite receiver 250 is configured to receive other forms of satellite communication, such as satellite radio signals or a satellite concierge service, that provide a time signal value. Although described as a receiver, the satellite receiver 250, in some examples, may include a satellite data transmitter that provides a capability to transmit data to the satellite 15.

As mentioned, the telematics device 200 and respective components 210-250 receive power from the connector 221, when the connector 221 is connected to the on-board diagnostics port of the vehicle 6. In particular, the telematics processor 210 controls and manages the reception and validation of timing signals. The telematics processor 210 has an internal clock that generates timing signal values that are stored in memory 240. The telematics processor 210 also receives external timing values from either the satellite receiver 250 or the cellular transceiver 230, and buffers or stores these external timing values in memory 240. The telematics processor 210 uses the stored internal clock signal values to validate the accuracy of the external timing values. In addition, the telematics processor 210 is configured to determine when the telematics device 200 connector 221 is disconnected from the vehicle 6 on-board diagnostics port. When the telematics device 200 connector 221 is reconnected to the on-board diagnostics port of the vehicle 6 and receives electrical power again, the telematics processor 210 reboots and receives an external timing signal from the satellite receiver 250 or the cellular transceiver 230. Using the received external timing signal, the telematics processor 210 reinitializes its internal clock by synchronizing to the received external timing signal. The telematics processor 210 also makes a disconnect determination using time values stored in the non-volatile memory 240 and the external timing signals received from the satellite receiver 250 or the cellular transceiver 230. In general, the telematics processor 210 is configured to determine a difference between time values stored in memory 240 and the received external timing signals, and respond according to the determination as described in more detail below.

Figure 3:
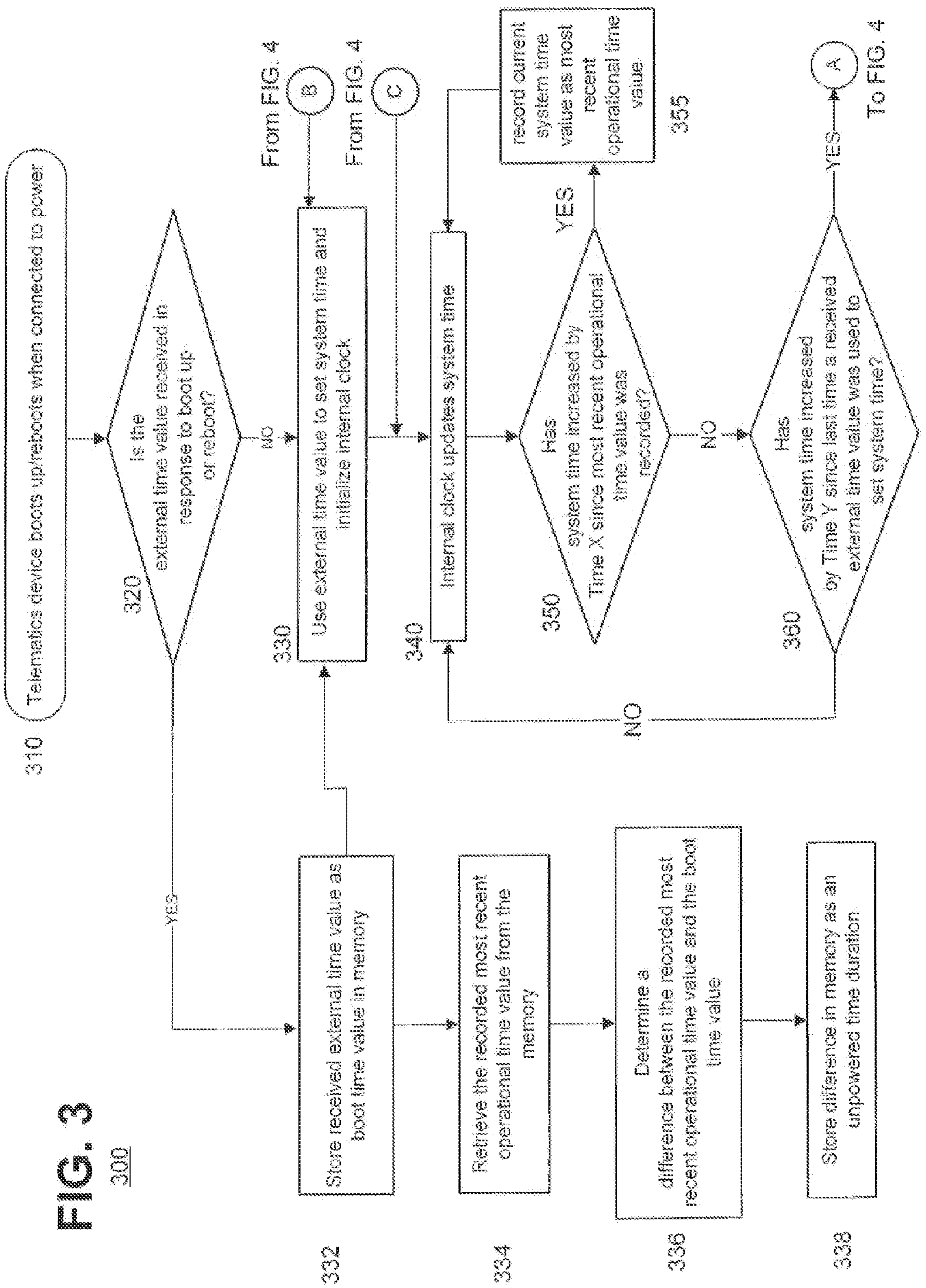
FIG. 3 is a flowchart showing an example of a process for maintaining accurate device timing and responding to conditions that indicate the disconnection of a telematics device from a vehicle on-board diagnostics port.

As described above, the telematics device 200 may be configured to provide a variety of functions related to the collection of data from a vehicle on-board diagnostics port. FIG. 3 is a flowchart showing an example of a process for maintaining accurate device timing and responding to conditions indicating that the telematics device was disconnected from a vehicle on-board diagnostics port.

In the process example 300 of FIG. 3, a telematics device, such as device 200, is configured to connect to an on-board diagnostics port of a vehicle, such as vehicle 6. The telematics device that is configured to implement the process 300 as described above with respect to FIG. 2.

The process 300, for example, begins when the connector 221 is connected or reconnected to the on-board diagnostics port (i.e. diagnostics interface) of the vehicle 6. At 310, the respective processors 210 and 220 boot up or reboot when connected to electrical power via the connection of the connector to the vehicle diagnostic interface. During boot up or reboot, the telematics processor 210 establishes a communication session connection with either a satellite system (15 in FIG. 1) or a communication network (8 in FIG. 1), or both. In the communication session, a data stream (formatted, for example, according to GSM, CDMA or LTE signal protocols) containing an external time value signal is received from the cellular network 8, the communication network transceiver 230. In other examples, the source of an external time signal is a GPS satellite 15 data stream received by the global positioning system receiver 250. In an example, the telematics processor 210 receives an external time value from a global positioning system receiver 250 or a communication network transceiver 230 and determines whether the external time value is received in response to a boot up or a reboot (320). If the determination is "YES," the process proceeds to step 332, which will be discussed in more detail below. In the present example, the determination is "NO," and the received external time value is used to set the system time and synchronize (or initialize) the internal clock to the external time (330). The initialized internal clock begins to increment and updates the system time, for example, every millisecond, second, minute, or the like (340). Concurrently, the OBD processor 220 collects data from the components and system of the vehicle, such as the engine, environmental data, airflow system and the like, as well as data related to operation of the vehicle, such as speed, braking data, emissions, and the like. The OBD processor 220 also manages the processing of the collected vehicle system and operational data with respect to system time. Of course, the system time provided by the telematics processor 210 clock (i.e. internal clock) and as updated by the external time values is available to components 210-250 of FIG. 2 as needed for their respective operations. For example, the OBD processor 220 collects data related to the speed of the vehicle 6, and uses the system time provided by the internal clock to timestamp a collected speed indication. In other words, the current system time is used as a timestamp for the currently collected vehicle operational data. In a specific example, when a most recent operational time value is being recorded in memory, vehicle operational data collected at that same time value as the most recent operational time value is also recorded, so the recorded most recent operational time value is also a timestamp for the vehicle operational data.

Figure 4:
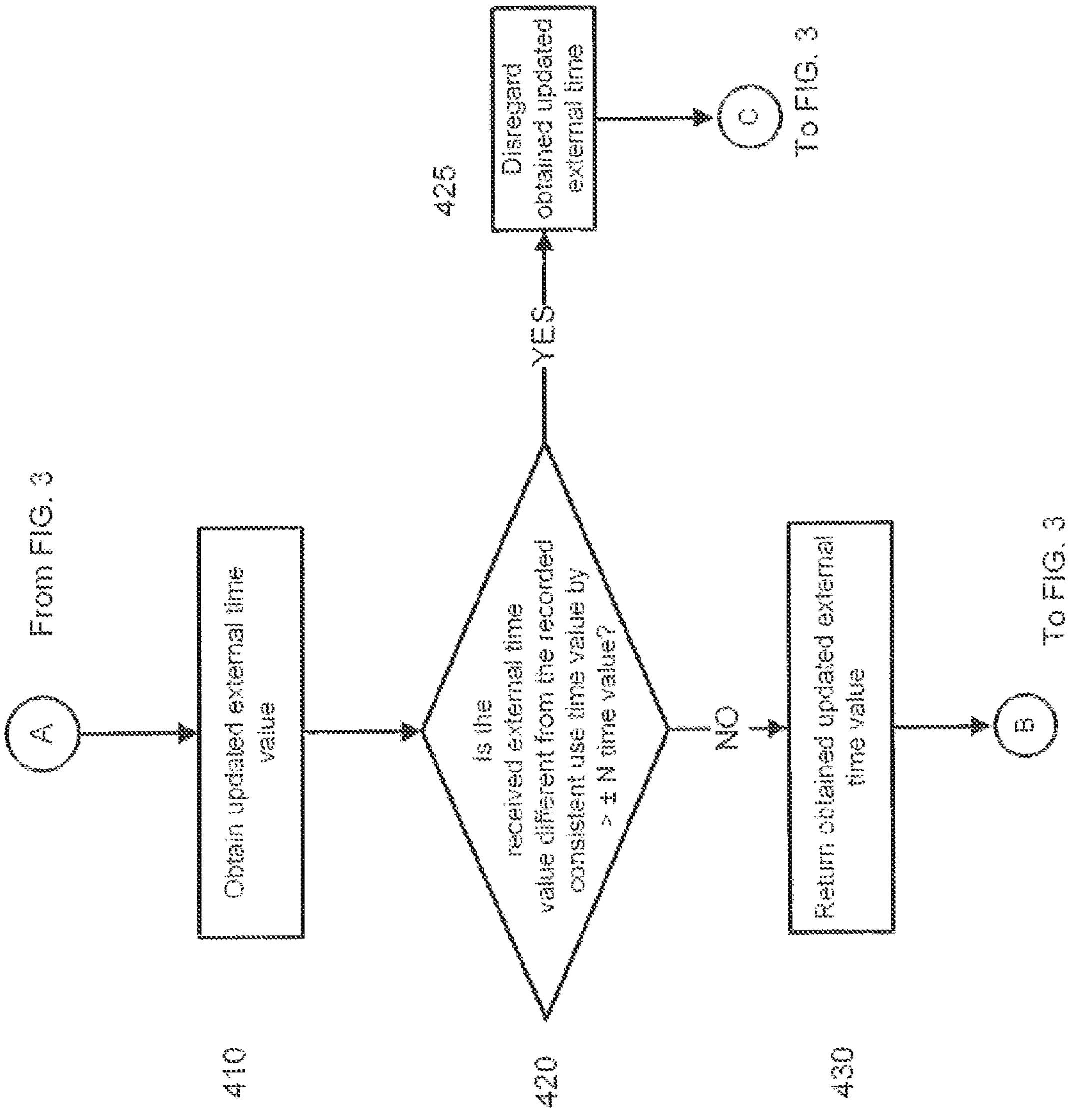
FIG. 4 is a flowchart showing an example of a process for confirming the accuracy of an external clock signal as part of the process of FIG. 3.

As system time updates (i.e. as the internal clock increments), a determination is made, by examining the current system rime value, whether the system time has run for a time (may be a first or subsequent instance of a periodic time interval or some other more irregular, event driven (e.g., based on time of day, day of the week), or a random period), such as time X, since a last system time value was examined (350). If the determination result, at 350, is a "YES" value, the process proceeds to record the current system time value as a most recent operational time value (355). The most recent operational time value is a time stamp recorded in memory, such as memory 240, used by other processes, and is updated whenever the internal clock progresses, for example, for X amount of time, or after X number of events, or the like. Once the most recent operation time value is recorded, the process 300 returns to the running clock at 340, and the time X loop repeats. Alternatively, if the determination result is a "NO" value, the process 300 proceeds make another determination. At step 360, a determination is made, by examining the current system time value, whether the system time has run for a time (may be a second or subsequent instance of a periodic time interval (e.g. every hour, 20 minutes or 10 minutes), or some other more irregular, event driven (e.g., based on time of day, day of the week), or a random period), such as time Y, since a last system time value was examined in the previous process step 350. If the determination result, at step 360, is a "NO" value, the process 300 returns to the internal clock updates of system time at step 340, and the time Y loop repeats. Alternatively, if the determination result, at 360, is a "YES" value, the process 300 proceeds to determine the validity of the accuracy of the external time value (A in FIG. 4). FIG. 4 is an example of a validation process for validating the accuracy of a received external time value that is used to update the system time.

However, before describing FIG. 4 in detail, FIG. 3 also illustrates additional process steps that are performed by the telematics processor 210 when the telematics processor boots up or is rebooted in response to a loss of power (for example, due to the telematics device 200 being disconnected from the vehicle diagnostics interface). For example, the reboot determination by the telematics processor 210 may be made based on checking register values for default settings that are only present during, or as a result of, a telematics device 200 boot up/reboot procedure, or some other indicator of a reconnection to electrical power. The additional processes 332-338, in response to a boot up, determine a duration of how long a telematics device was disconnected from a vehicle diagnostics interface and provided electrical power.

At step 332, the received external time value received at step 320 is stored in memory as a boot time value. In addition, the received external time is provided to step 330 to set system time and synchronize the internal clock to the external time, so the telematics device can begin collecting operational data. Upon storing the boot time value, the recorded most recent operational time value (recorded at process step 355) is retrieved by the telematics processor 210 from memory 240 (334). The telematics processor 210 determines a time difference between recorded most recent operational time and the boot time value (336) and the time difference is stored in memory as an unpowered duration time (338). The time is an indication of how long of a time the telematics device 200 was unpowered (i.e. disconnect time period duration). The disconnect time period duration, or unpowered time duration, is defined as the duration between the time that the telematics device 200 connector 221 is unplugged, or disconnected from the on-board diagnostics port of the vehicle 6, and the time when the telematics device 200 connector 221 reconnected to, or plugged back into, the on-board diagnostics port.

In a specific example:

a) The most recent operational time value stored in memory (in, for example, 24 hour format with date) when the telematics device 200 was connected to the on-board diagnostics port is: 11:00:00 09/10/14;

b) The telematics device is disconnected at time value: 11:08:00 09/10/14; and c) The telematics device is reconnected at time value: 13:03:00 09/10/14.

d) The time difference, or unpowered time duration, is calculated at step 336 as approximately: (c)−(a)=02:03:00 09/10/14.

Figure 5:
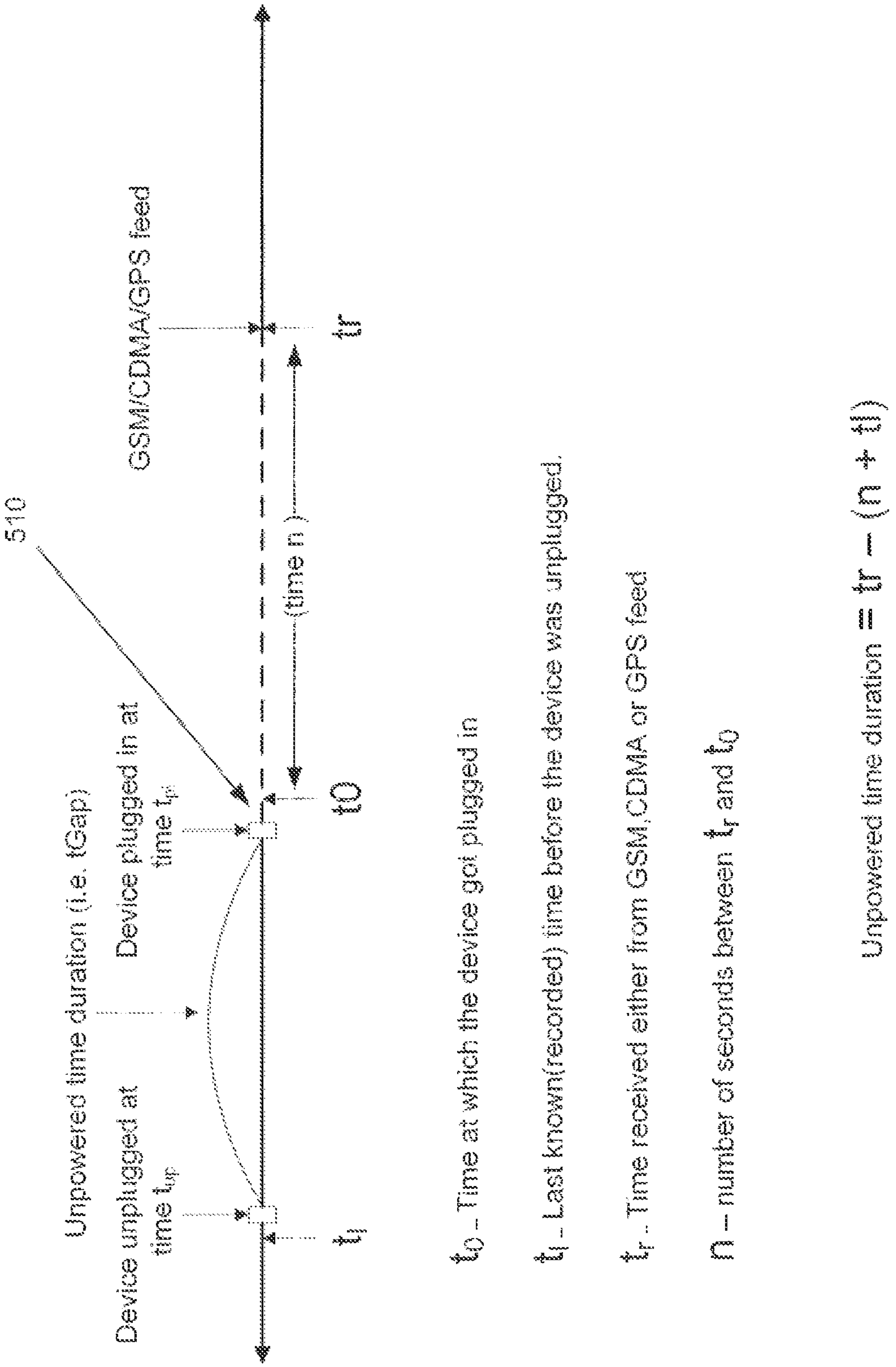
FIG. 5 illustrates an example of an alternative method for determining the period of time that a telematics device is disconnected from the diagnostics interface.

The time resolution for the disconnect period may be 1 minute, 10 minutes, 15 minutes, 20 minutes, or more or less or fractions thereof. The time difference, in this example, is calculated by the telematics processor 210. Alternatively, the two stored time values (boot time value and the most recent operational time value) may associated with one another, and may be included in the data forwarded to the entity server 17. At the entity server 17, the data may processed and the time difference determined remotely from the telematics device 200. An alternative example of determining an unpowered time duration is illustrated in FIG. 5 and described in more detail below.

It is noted when the telematics device boots up a first or initial time at step 310, some of the above described time values, such as the most recent operational time value, and boot value, may not yet be stored in memory. For example, the unpowered duration determination performed at the initial boot up of the telematics device should not indicate any, or only an unsubstantial, difference between the boot time value and the recorded most recent operational time value. Accordingly, the initial boot up process may populate the memory for the respective values with dummy values that either indicate to the telematics processor 210 or to an entity server 17, that the particular boot up was an initial boot up of the telematics device 200.

As mentioned with reference to step 360, the validity, or accuracy, of the received time is checked in the process illustrated in FIG. 4 to prevent an erroneous time from being used in making a determination of the duration of a disconnect period, and unduly causing a user to be penalized for exceeding any pre-established disconnect parameters. The validity of the received time may be determined using a variety of methods. FIG. 4 is a flowchart showing an example of a process for validating (i.e. confirming the accuracy) of a time value. The time value, in this example, is an external time value received from an external time source, such as a satellite receiver 250 or a communications transceiver 230.

In an example, the process 400 is a sub-process that is performed by the telematics processor 210. In another example, the sub-process 400 may be performed by a server, such as entity server 17.

The process 400 obtains an updated external time value 410, and analyzes the updated external time value to make a determination of the accuracy of the obtained updated external time value. The determination in step 420 may be made in variety of ways. In an example, a determination of whether a difference between the obtained updated external time value and the recorded most recent operational time value is greater than a variance threshold time value (i.e. ±N, where N is a threshold time value in the format of the received external time value) (420). For example, N may be equal to 48 hours, 72 hours, 96 hours or the like. In other words, the determination is based on a comparison of a difference of the two time values to the variance threshold time value (±N). The difference can be an absolute difference.

In response to the comparison result value exceeding the variance threshold time value (i.e. >±N) (i.e. indicating that the obtained external time value is inaccurate), the sub-process 400 disregards the updated external time value as inaccurate (425), and returns to process 300 of FIG. 3 prior to step 340. The net effect is that the obtained updated external time value (or subsequent time value from a previous example) is ignored as an invalid, or inaccurate, time value, and a next update to the external time value is obtained after another time Y.

Alternatively, in response to the comparison result value indicating the difference is less than the variance threshold time value (i.e. <±N) (i.e. indicating that the obtained external time value is accurate), the sub-process 400 proceeds to step 430 that returns the obtained external time value returns to (B) to process 300. In process 300, the obtained external time value is used at process step 330 to set the system time to the obtained updated external time value.

As mentioned above the accuracy determination of the obtained external time value may be made in a variety of ways. For example, a statistical analysis of a history of external time values may be performed, or the variance threshold time value may dynamically change as the system time increases (e.g., thereby rewarding, in the form of a reduced insurance premium, for example, a user for an extended period of continuous use of the telematics device), or some other determination process may be used.

As mentioned, alternative methods to the previously described methods for determining the period of time that a telematics device 200 is disconnected from the diagnostics interface may be used. FIG. 5 illustrates an example of an alternative method for determining the period of time that a telematics device 200 is disconnected from the diagnostics interface. In the example, a last known time, which is recorded as the most recent operational time value, before a telematics device 200 is disconnected, or unplugged, from a vehicle diagnostics interface is time $t_L$. Sometime after $t_L$, the telematics device 200 unplugged (i.e. $time_{up}$) from the diagnostics interface. As a result, the telematics device 200 is unpowered, does not collect vehicle operational data, and system time remains at the last recorded time, which was $t_L$.

After some time, the telematics device 200 is reconnected to (e.g. plugged into) the diagnostics interface at time $t_{pi}$. FIG. 5 shows the time $t_{up}$ and $t_{pi}$ as the unpowered time duration (i.e. tGap). After the telematics device 200 is reconnected, the telematics device processor 210 is booting up, and the internal processor clock may not immediately start. As a result, (here may be a brief time delay 510, such as 0.1 milliseconds, before the infernal clock starts keeping time at time t0. The internal clock continues keeping time as long as the telematics device remains connected. After an amount of time passes, such as time Y in FIG. 3, an hour, an arbitrary time since the last time report was transmitted for use by the Telematics device or some other timeframe, a time value $t_r$ is received from either a cellular transceiver or a GPS receiver.

Referring back to FIG. 3, since the time $t_r$ was received in response to a boot up or reboot, the determination at decision block 320 is YES and the process proceeds to step 332. Time $t_r$ is stored as the boot time value at step 332. At step 334, the time $t_L$ is retrieved from memory as the most recent operational time value, and the process proceeds to step 336.

However, in this alternative example, step 336 involves an extra time value that is included in the difference determination. Referring back to FIG. 5, the extra time value is the internal clock time n. Time n can be in milliseconds, seconds, minutes, a count value that corresponds to a time, or other units suitable for making the difference determination. Time n is the time from t0 to time $t_r$. The time n is extra time that is included in the unpowered time duration determination in FIG. 3. In order to account for this time, when the telematics device is connected and before a next time value is received, a different equation of calculating the unpowered time duration is used in this example. The unpowered time duration is equal to the time $t_r$ minus the sum of time n and the most recent operational time recorded in memory (i.e.$=t_r-(\text{time } n+t_L)$).

This alternative calculation provides the additional benefit of accounting for an instance in which the time from GPS receiver or the cellular receiver is not received for some time after the telematics device has been reconnected to the diagnostics interface. In such a system, the unpowered time duration is more accurately determined.

The telematics device 200 may also provide additional functionality. The memory 240 may also store criteria used by the telematics processor 210 to determine whether the user has operated the vehicle outside the parameters agreed upon for use of the telematics device 200. For example, a user may agree to operate the vehicle 6 within certain operational parameters. The telematics processor 210 may analyze data obtained from the on-board diagnostics port 220 and from the first and second time sources and telematics cluck 270 with reference to the criteria stored in memory 240 to confirm that the user is operating the vehicle 6 within the operation parameters.

In order to determine if predetermined thresholds have been exceeded, the telematics processor 210 may compare the unpowered difference value to a predetermined criterion. The comparison is used to determine whether the telematics device 200 was disconnected (i.e. not receiving power) from the vehicle 6 on-board diagnostics port for a disconnect period that equals or exceeds the predetermined disconnect threshold. The predetermined disconnect threshold may be stored in memory and may be updated through communications with the entity server 17. If the comparison returns a comparison result that indicates that the predetermined criterion was exceeded, the telematics processor 210, in some instances, may generate an indication that the predetermined disconnect criterion was exceeded. The indication may be stored in memory 240 or may be transmitted via the cellular communication transceiver 230 to the entity server 17 for processing according to entity procedures. In an example, the entity is an insurance company, and the disconnect value corresponding to the unpowered difference value is transmitted to the insurance company server because the generated indication is that the predetermined disconnect criterion was exceeded.

It is noted that the vehicle's diagnostic interface does not supply power to the telematics device in the event of an alternator or a battery failure, or if the battery is removed. As a result, the telematics device 200 may indicate an abnormal unpowered duration. This event may be reconciled by an entity analyzing the vehicle operational and related data provided by the telematics device, or the telematics processor may be configured to provide the additional functionality to resolve such unpowered durations resulting from such events.

Aspects of the methods of determining the validity of the external lime value as a valid or an invalid time value and oilier functions of the telematics device examples outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof such as various semiconductor memories, tape drives, disk drives and the like, which may provide non-transitory storage at any time for the computer software programming. All or portions of the software may at times be communicated through the Internet or various other telecommunication networks. Such communications, for example, may enable loading of the software programs from one computer or processor into another, for example, from a management server or host computer of an entity, such as a third-party telematics service provider or insurance company, into the telematics computer platform of a user that will be the telematics device for connection to the diagnostic interface of a vehicle. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the validity determination and the other telematics functions, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that tail within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A telematics device configured to connect to a diagnostic interface of a vehicle, comprising:

a receiver for receiving data from an external data source, wherein the data received from the external source includes an external time value;

an interface configured to provide communication for the telematics device with components of the vehicle;

a clock for providing an internal time value;

a memory; and a processor coupled to the memory, wherein the processor receives power while connected to the diagnostic interlace of the vehicle, and is configured to perform various functions, including functions to:

in response to connection of the telematics device to the diagnostic interface, receive an external time value from the receiver;

initialize the clock using the received external time value;

after passage of each of one or more first predetermined time periods:

record an updated internal time value from the clock as the most recent operational time value in the memory, after passage of each of one or more second predetermined time periods, wherein the second predetermined time periods are longer m duration than the first predetermined time periods:

obtain a subsequent updated external time value from the receiver;

determine the validity of the subsequent external time value as a valid or an invalid time value based on a comparison to a variance threshold time;

based on a determination that the obtained subsequent updated external time value is valid, re-initialize the clock using the obtained subsequent updated external time value; and record the subsequent updated external time value as the system time;

alter passage of another second predetermined time period:

obtain another updated external time value from the receiver;

determine the validity of the obtained another updated external time value as a valid or an invalid time value based on a comparison to a variance threshold time; and based on a determination that the obtained another updated external time value is invalid, disregard the obtained another updated external time value; and implement a telematics function based on a system time provided by the clock in relation to communications via the interface.

2. The telematics device of claim 1, wherein the processor is further configured to control the telematics device to perform functions, including functions to:

after passage of a further second predetermined time period, wherein the further second predetermined time is later in time than the another second predetermined time period:

in response to the reconnection of the telematics device to die diagnostic interface of the vehicle, obtain a further external time value from the receiver;

store the obtained further external time value as a reconnect boot time value in memory;

determine a unpowered difference value between the stored reconnect boot time value and the recorded most recent operational time value, wherein the unpowered difference is an indication of a time duration that the telematics device was unpowered; and store the unpowered difference in memory.

3. The telematics device of claim 1, wherein the processor is further configured to control the telematics device to perform functions, and the function to determine the validity of the subsequent updated external time value as a valid or an invalid time value, includes further functions to:

indicate that the subsequent updated external time value is valid in response to a comparison result in which a difference between the subsequent updated external time value and the most recent operational time value is less than the variance threshold value.

4. The telematics device of claim 1, wherein the processor is further configured to control the telematics device to perform functions, and the function to determine the validity of the another updated external time value as a valid or an invalid time value based on a comparison to a previously recorded system time, includes functions to:

indicate that the another updated external time value is invalid in response to a comparison result in which a difference between the another updated external time value and the most recent operational time value exceeds a variance threshold value.

5. The telematics device of claim 1, wherein the processor is further configured to control the telematics device to perform functions, including functions to:

transmit a disconnect value corresponding to the unpowered difference value to an insurance company service provider server.

6. The telematics device of claim 1, wherein the receiver is a wireless telephony/broadband data transceiver, and the processor is further configured to perform functions, including functions to:

obtain the external time value from a wireless telephony/broadband data stream.

7. The telematics device of claim 1, wherein the receiver is a satellite communication receiver, and the processor is further configured to perform functions, including functions to:

obtain the external time value from a satellite communication data stream.

8. The telematics device of claim 7, wherein the satellite communication receiver is a global positioning system receiver.

9. The telematics device of claim 1, further comprising:

an on-board diagnostics port connector for connecting the telematics device to the diagnostic interface of a vehicle and providing power to the telematics device.

10. The telematics device of claim 1, wherein the roost recent operational time value is based on an internal time value provided by the clock.

11. A method, comprising:

receiving, by a telematics device processor, an external time value from an external time source signal;

determining the validity of the received external time value by determining a difference of the received external time and a recorded most recent operational time value and comparing the difference to a variance threshold time value;

based on the result of the comparison, initializing the internal clock;

obtaining an updated external time value from another external time source signal;

validating, by the telematics device processor, the accuracy of the received updated external time value by comparing a difference of the received updated external time and another recorded most recent operational time value to a variance threshold time value; and based on the results of the comparison, disregarding the updated external time value and waiting for a next updated external time value.

12. The method of claim 11, wherein the comparison result indicated that the difference of the received external time and a recorded most recent operational time value was less than the variance threshold time value.

13. The method of claim 11, wherein the comparison result indicated that the difference of the received external time and a recorded most recent operational time value exceeded the variance threshold time value.

* * * * *